(12) United States Patent
Dumont et al.

(10) Patent No.: US 12,241,172 B2
(45) Date of Patent: Mar. 4, 2025

(54) ANODIZED BIOCIDAL METALLIC MATERIAL, PROCESS FOR MAKING THE MATERIAL AND METHOD FOR REACTIVATING THE MATERIAL

(71) Applicant: A3 SURFACES INC., Saguenay (CA)

(72) Inventors: Maxime Dumont, Jonquière (CA); Jocelyn Lambert, Roberval (CA); Guy Leblanc, Chicoutimi (CA); Martin Lambert, Chicoutimi (CA); Michel Lavoie, La Baie (CA); Jean-Pierre Collard, Chicoutimi (CA); Myriam Auclair-Gilbert, Chicoutimi (CA); Simon Gagnon, Dolbeau-Mistassini (CA)

(73) Assignee: A3 Surfaces Inc., Saguenay (CA)

( * ) Notice: Subject to any disclaimer, the term of this patent is extended or adjusted under 35 U.S.C. 154(b) by 155 days.

(21) Appl. No.: 17/836,559

(22) Filed: Jun. 9, 2022

(65) Prior Publication Data

US 2022/0298666 A1 Sep. 22, 2022

Related U.S. Application Data

(63) Continuation of application No. PCT/CA2020/051697, filed on Dec. 9, 2020.
(Continued)

(51) Int. Cl.
*C25D 11/18* (2006.01)
*A01N 59/00* (2006.01)
(Continued)

(52) U.S. Cl.
CPC .............. *C25D 11/18* (2013.01); *A01N 59/00* (2013.01); *C25D 11/02* (2013.01); *C25D 11/04* (2013.01);
(Continued)

(58) Field of Classification Search
CPC ...................................................... C25D 11/18
See application file for complete search history.

(56) References Cited

U.S. PATENT DOCUMENTS

| 6,168,869 B1 | 1/2001 | Tomioka et al. |
| 6,379,523 B1 | 4/2002 | Takabayashi |
| (Continued) | | |

FOREIGN PATENT DOCUMENTS

| CA | 2909198 A1 | 10/2013 |
| CA | 2927658 A1 | 4/2015 |
| (Continued) | | |

OTHER PUBLICATIONS

Extended European Search Report for corresponding EP application No. 20898684.4 dated Dec. 7, 2023.
(Continued)

*Primary Examiner* — Brian W Cohen
(74) *Attorney, Agent, or Firm* — Damien Calvet; Gowling WLG (Canada) LLP

(57) ABSTRACT

A process for the making of metallic product with biocidal properties is disclosed, and first comprises anodizing a product having at least one metallic surface (e.g. aluminum, steel) using a controlled current density to form pores on the surfaces with controlled spatial density and depth. The process also comprises contacting the anodized metallic surfaces with a first biocidal solution before sealing the pores. Preferably, the metallic surfaces can be contacted again with the first biocidal solution after the sealing step. A method for reactivating biocidal properties of the metallic products is also disclosed, and comprises contacting again the biocidal product with a second biocidal solution. Preferably, the second solution is less concentrated than the first solution for safety sake. The invention provides a simpler, quicker, cheaper and improved process for treating or reac-
(Continued)

tivating the metallic surfaces in order to obtain a metallic product having superior and enduring biocidal properties.

30 Claims, 2 Drawing Sheets

Related U.S. Application Data

(60) Provisional application No. 62/946,272, filed on Dec. 10, 2019, provisional application No. 63/044,164, filed on Jun. 25, 2020.

(51) Int. Cl.
    *C25D 11/02*     (2006.01)
    *C25D 11/04*     (2006.01)
    *C25D 11/12*     (2006.01)
    *C25D 11/24*     (2006.01)

(52) U.S. Cl.
    CPC .............. *C25D 11/12* (2013.01); *C25D 11/24* (2013.01); *C25D 11/246* (2013.01)

(56) References Cited

U.S. PATENT DOCUMENTS

| | | | |
|---|---|---|---|
| 7,695,522 B2 | 4/2010 | Pickford et al. | |
| 8,609,254 B2 | 12/2013 | Cabot et al. | |
| 8,900,716 B2 | 12/2014 | Hodges et al. | |
| 9,332,765 B2 | 5/2016 | Lin et al. | |
| 10,980,914 B2 * | 4/2021 | Tsuchiya | A61L 27/06 |
| 2014/0367263 A1 | 9/2014 | Fukui et al. | |
| 2016/0152839 A1 * | 6/2016 | Lai | C25D 11/18 |
| | | | 205/202 |
| 2018/0133370 A1 | 5/2018 | Turner et al. | |
| 2018/0280143 A1 * | 10/2018 | Gorhe | C25D 11/026 |

FOREIGN PATENT DOCUMENTS

| | | |
|---|---|---|
| EP | 1494729 B1 | 11/2005 |
| EP | 2031099 A1 | 3/2009 |
| EP | 2663671 B1 | 10/2017 |
| EP | 3586882 A1 | 1/2020 |
| EP | 2571684 B1 | 4/2020 |
| JP | 11323597 A | 11/1999 |
| KR | 100504994 B1 | 7/2005 |
| WO | 2013155618 A1 | 10/2013 |
| WO | 2015/003798 A1 | 1/2015 |

OTHER PUBLICATIONS

Valiei, A. et al., "Anodized Aluminium with Nanoholes Impregnated with Quaternary Ammonium Compounds Can Kill Pathogenic Bacteria within Seconds of Contact", ACS Applied Materials & Interfaces, Nov. 5, 2018, vol. 10(48), pp. 41207-41214.
International Search Report from corresponding application PCT/CA2020/051697 dated Feb. 12, 2021.

\* cited by examiner

2000 contacting the at least one surface of a biocidal metallic product obtained by the process 1000, with a second biocidal solution (2100)

FIG. 2

ANODIZED BIOCIDAL METALLIC MATERIAL, PROCESS FOR MAKING THE MATERIAL AND METHOD FOR REACTIVATING THE MATERIAL

CROSS-REFERENCE TO RELATED APPLICATIONS

The present non-provisional patent application is a Continuation of International Patent Application PCT/CA2020/051697, filed Dec. 9, 2020, which is hereby incorporated by reference in its entirety, and which claims the benefits of priority of U.S. Provisional Patent Application No. 62/946,272 entitled "PROCESS FOR MAKING BIOCIDAL METALLIC MATERIALS", and filed at the United States Patent and Trademark Office on Dec. 10, 2019; and U.S. Provisional Patent Application No. 63/044,164 entitled "PROCESS FOR MAKING BIOCIDAL METALLIC MATERIALS AND METHOD FOR RELOADING THE SAME", and filed at the United States Patent and Trademark Office on Jun. 25, 2020, the content of which is incorporated herein by reference.

FIELD OF THE INVENTION

The present invention generally relates to processes for making metallic materials or products, more particularly metallic products having anodized surfaces with biocidal properties. The present invention also generally relates to the biocidal metallic products made by the same process and method. The present invention further relates to a method for reactivating a metallic biocidal product after a certain period of time to maintain its biocidal properties.

BACKGROUND OF THE INVENTION

Pathogenic microbes are pervasive with their transmission in public spaces playing an important role in triggering infectious outbreaks. Nosocomial (hospital-acquired) infections are the sixth leading cause of death in western countries, with larger incidence in developing countries. Another major culprit in the spread of infectious diseases is public transport such as buses, trams and subways. Biocidal materials for use in high-contact areas such as hospitals and public transport have been developed to mitigate risks associated with bacteria capable of living on regular metallic surfaces for several months.

Aluminum and aluminum alloys materials are light, have strength, softness and provide some durability against corrosion once anodized. Applications of aluminum alloys products are numerous and include kitchen wares, household furniture, appliances, door knobs, medical devices, etc. However, aluminum does not have biocidal properties of its own and microorganisms can easily stay alive on its surface. Various methods have been developed for treating surfaces of aluminum or aluminum alloy products for improving their biocidal properties. However, these methods and the products obtained therefrom are less than optimal because biocidal activity is either weak or limited to few bacterial species and/or because antibacterial treatment is not compatible to dying of the aluminum product. Furthermore, these methods may not be applicable to biocidal treatment of other anodizable metals such as magnesium, zinc, niobium, tantalum and titanium.

Steel and stainless steel are largely used in the making of products such as kitchen counters, door handles, or door pushing plates, to only cite these examples. However, surface treatment of steel product generally implies a precoating of the steel plate before being able to make the surface of the steel product biocidal. As disclosed in US 2018/0133370 (Turner et al.), the steel plate has to be previously plated or coated with a metal, such as titanium.

WO 2013/155618 A1 (Arsenault et al.) discloses a metallic product having an anodized surface with antimicrobial properties, and a method for producing such a metallic product. The antimicrobial metallic product comprises a porous surface layer formed by anodization, the porous surface layer comprising an electrodeposit of at least one metal, and at least one antimicrobial compound. The electrodeposited metal may be selected from silver, gold, copper, nickel, zinc, tin, palladium, cadmium and platinum. Arsenault et al. clearly specifies that silver (Ag) is electrodeposited to the porous surface layer because this metal possesses combined aesthetic and antimicrobial properties. However, the electrodeposit step of the method as disclosed in Arsenault et al. implies important additional costs for the product manufacturing.

Furthermore, the known solutions do not allow extending the useful life of the biocidal metallic products once these products have been permanently installed on site, such as for instance urban furniture, support bars in public transport (e.g. bus, subway cars), door handles, kitchen counters, etc.

There is thus a need for an improved process for treating the surface of anodizable metals, in order to obtain a metallic product having biocidal properties effective in killing a broad spectrum of microorganism, including Gram-positive microbial pathogens, Gram-negative microbial pathogens, viruses such as coronaviruses (e.g. SARS-CoV-2), and yeasts.

There is also a need for a method for reactivating the metallic surface of the metallic biocidal products and therefore extending the useful life of the biocidal metallic products.

The present invention addresses other needs, as it will be apparent from review of the disclosure, drawings and description of the features of the invention hereinafter.

SUMMARY OF THE INVENTION

The shortcomings of the prior art are generally mitigated by the process has described herein for the making of a metallic product having long lasting biocidal properties.

According to a first aspect, the invention is directed to a process for the making of a metallic product having biocidal properties, the process comprising:
  anodizing a product having at least one metallic surface using a controlled current density, the controlled anodization allowing to form pores all over the at least one metallic surface with controlled spatial density and depth; or alternatively
  providing a product previously anodized for having at least one anodized metallic surface;
  contacting the at least one metallic surface with a first biocidal solution for a first period of time; and
  sealing the pores.

According to a preferred embodiment, the process further comprises after sealing the pores: contacting again the at least one metallic surface of the metallic product with the first biocidal solution.

According to a preferred embodiment, the process further comprises after anodizing: rinsing the metallic product with an acidic solution. Preferably, the acidic solution may comprise 0.15 to 5% of sulfuric acid.

According to a preferred embodiment, the process may further comprise rinsing again the metallic product with a second acidic solution or water, wherein a temperature the second acidic solution or the water is inferior to a temperature of the metallic product in order to form fissures on the at least one metallic surface.

According to a preferred embodiment, the anodizing step comprises anodizing the at least one metallic surface using a current ranging from about 1 $A/dm^2$ to about 5 $A/dm^2$, preferably 2 to 4 $A/dm^2$.

According to a preferred embodiment, the first biocidal solution comprises a first concentration of at least one antibiotic, biocidal peptide, enzyme, cationic compound, or a combination thereof. Preferably, the first biocidal solution comprises at least one cationic compound, such as for instance at least one quaternary ammonium compound.

According to a preferred embodiment, the first biocidal solution may further comprise at least one metallic salt. Preferably, the at least one metallic salt is $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$ or a combination thereof.

According to a preferred embodiment, the at least one metallic salt is $AgNO_3$, whereby in use, $AgNO_3$ with the at least one quaternary ammonium compound form in situ $AgCl$.

According to a preferred embodiment, the contacting step comprises: dipping the at least one metallic surface in the first biocidal solution for the first period of time, preferably for about 15 seconds to about 60 minutes, preferably from about 5 to 45 minutes, more preferably from about 15 to 30 minutes.

According to a preferred embodiment, the step of sealing the pores comprises: heating the at least one metallic surface into a bath of water or of nickel acetate solution, the bath being at a temperature of about 70-90° C. for a second period of time, preferably from about 1 to 15 minutes.

According to a preferred embodiment, the at least one metallic surface comprises steel, aluminum, titanium, zinc, magnesium, niobium, tantalum or anodizable alloys thereof. Preferably, the metallic product comprises aluminum or anodizable alloys thereof. Alternatively, the metallic product may comprise steel or anodizable alloys thereof.

According to a second aspect, the invention is directed to a biocidal metallic product obtained by the process as defined herein, wherein the metallic product has at least one treated anodized surface having sealed pores with a depth of the pores from 5 to 150 µm, preferably of from 50 to 100 µm. The anodized surfaces of the biocidal metallic product, in addition of the pores formed during the anodizing step, may also comprise a plurality of cracks or fissures, typically formed during the preferred steps of rinsing the products with acidic solution and water at a lower temperature.

According to a preferred embodiment, the biocidal metallic product comprises steel, aluminum, titanium, zinc, magnesium, niobium, tantalum or anodizable alloys thereof. Preferably, the metallic product comprises aluminum or anodizable alloys thereof. Also, the biocidal metallic product may comprise steel, or anodizable alloys thereof.

According to a preferred embodiment, the metallic product has treated anodized surfaces having sealed pores all over the surfaces with a diameter of the pores ranging from 5 to about 100 nm.

The biocidal metallic products of the present invention are particularly useful in the manufacture of articles used in houses, medical facilities and public transports, such as for instance in the making of kitchen wares, kitchen countertops, hospital countertops, furniture, fixtures, appliances, office equipment, door knobs, door pushing plates, medical devices, wall panels, floor panels, machine keypads and grab rails.

The products obtained by the process disclosed herein shows a controlled color and longer biocidal properties. Furthermore, the biocidal metallic surfaces obtained by the process improved biocidal properties in high humidity and aqueous environments.

The process disclosed herein is simpler, quicker and cheaper for treating the surface of anodizable metals than the previous, for instance by eliminating steps related to the electrodeposition of metals onto the anodized surface.

The present is invention is also directed to a method for reactivating the biocidal properties of a biocidal metallic product obtained by the process as defined herein, the method comprising:

contacting the at least one surface of said biocidal metallic product with a second biocidal solution, extending as such the useful life of the product.

According to a preferred embodiment, the step of contacting at least one surface of said biocidal metallic product with a second biocidal solution comprises: spraying the second solution over the at least one surface; and letting the spread second solution over the at least one surface for a third period of time. The third period of time is preferably from 5 seconds to 30 minutes. Preferably, the method may further comprise: removing an exceeding portion of the second biocidal solution from the at least one surface.

According to another preferred embodiment, the step of contacting at least one surface of said biocidal metallic product with a second biocidal solution comprises: applying the second solution over the at least one surface with a cloth previously soaked in the second biocidal solution. Preferably, applying the second solution over the at least one surface with a cloth previously soaked into the solution comprises: wiping at least one time the at least one surface with the soaked cloth. Preferably, the at least one surface is wiped several times with the soaked cloth.

According to yet another preferred embodiment, the step of contacting at least one surface of said biocidal metallic product with a second biocidal solution comprises:

soaking the biocidal metallic product into the second solution for a given period of time; and removing the biocidal metallic product from the second solution.

According to a preferred embodiment, the method further comprises removing an exceeding portion of the second solution from the at least one surface.

According to a preferred embodiment, the second biocidal solution comprises a second concentration of at least one of antibiotics, biocidal peptides, enzymes, cationic compounds or a combination thereof.

According to a preferred embodiment, the second solution comprises at least one cationic compound. Preferably, the cationic compound comprises at least one quaternary ammonium compound.

According to a preferred embodiment, the biocidal solution may further comprise at least one metallic salt, such as $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$, and a combination thereof. More preferably, the salt is $AgNO_3$ reacting with the quaternary ammonium chloride to form in situ silver chloride $AgCl$.

According to a preferred embodiment, the second concentration of the second solution is inferior to the first concentration of the first solution as defined herein. Preferably, the second concentration is about ten times inferior than the first concentration.

Advantageously, the biocidal metallic products in accordance with the resent invention can be further treated by the method as defined herein after a period of time for reactivating the biocidal properties of the metallic surfaces, and therefore extending the useful life of the biocidal metallic products. This is particularly convenient when the metallic products to be re-activated are fixed, such as door handles, bars in transport vehicles such as car, bus, train and subway, or kitchen counters.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 2 illustrates a method for reactivating biocidal properties of a biocidal metallic product according to preferred embodiments.

DETAILED DESCRIPTION OF PREFERRED EMBODIMENTS

Figure 1:
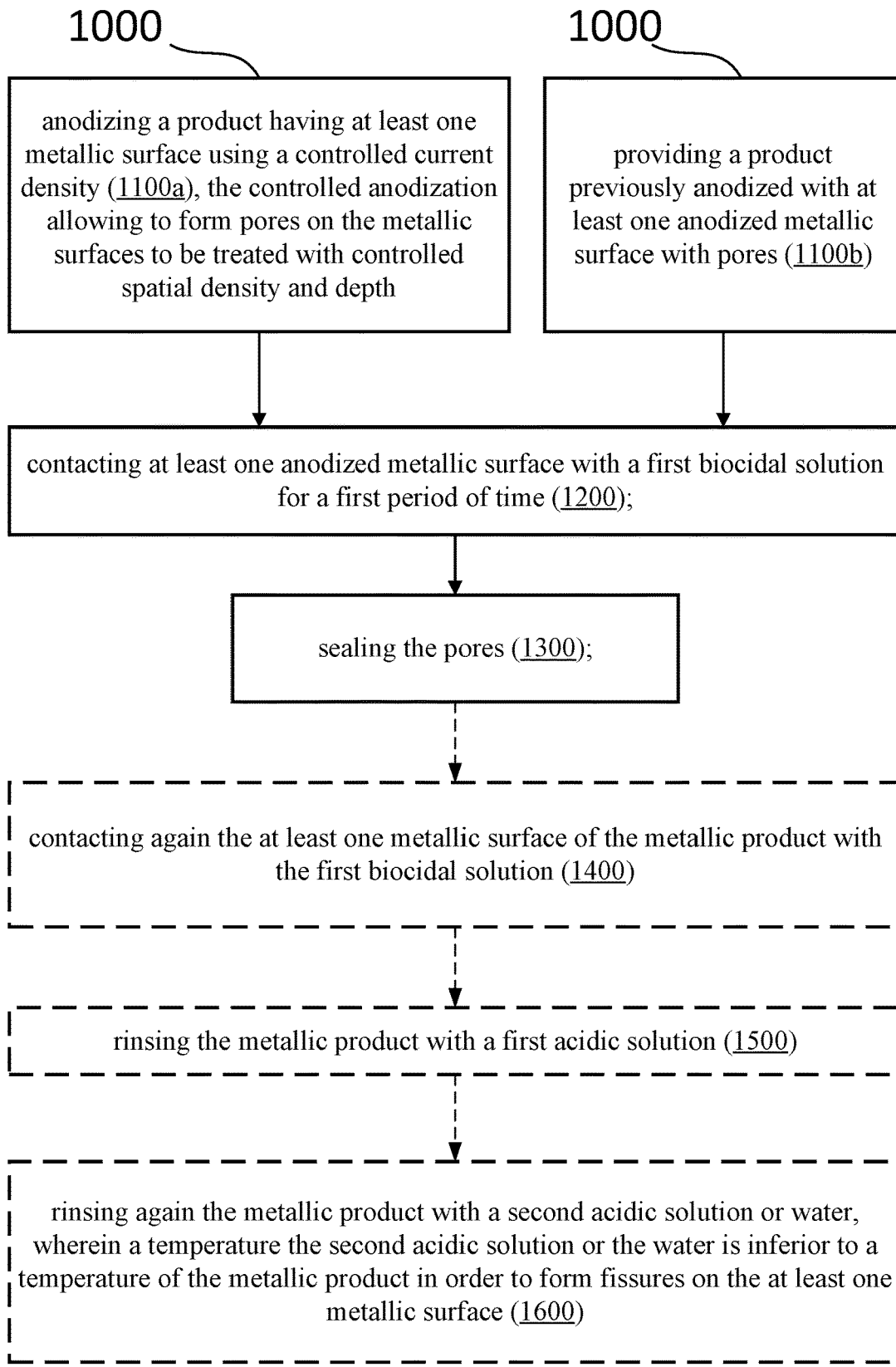
FIG. 1 illustrates a process for the making of a metallic product having long lasting biocidal properties according to preferred embodiments.

A novel process for making a biocidal metallic product will be described hereinafter, together with a new method for reactivating the biocidal metallic product. Although the invention is described in terms of specific illustrative embodiments, it is to be understood that the embodiments described herein are by way of example only and that the scope of the invention is not intended to be limited thereby.

The terminology used herein is in accordance with definitions set out below.

As used herein % or wt. % means weight % unless otherwise indicated. When used herein % refers to weight % as compared to the total weight percent of the phase or composition that is being discussed.

By "about", it is meant that the value of weight % (wt. %), time, pH, volume or temperature can vary within a certain range depending on the margin of error of the method or device used to evaluate such weight %, time, pH, volume or temperature. A margin of error of 10% is generally accepted.

By "room temperature", it is meant a temperature of the direct environment, for instance a temperature of 20° C.±10° C.

The description which follows, and the embodiments described therein are provided by way of illustration of an example of particular embodiments of principles and aspects of the present invention. These examples are provided for the purposes of explanation and not of limitation, of those principles of the invention. In the description that follows, like parts and/or steps are marked throughout the specification and the drawing with the same respective reference numerals.

According to a first aspect, the invention is directed to a process for making a biocidal metallic product having at least one biocidal surface.

FIG. 1 illustrates a preferred embodiment of the process (1000) for the making of a metallic product having biocidal properties, the process comprising:

anodizing a product having at least one metallic surface using a controlled current density (1100a), the controlled anodization allowing to form pores all over the at least one metallic surface with controlled spatial density and depth; or alternatively providing a product previously anodized for having at least one anodized metallic surface (1100b);

contacting the at least one metallic surface with a first biocidal solution for a first period of time (1200); and sealing the pores (1300).

According to a preferred embodiment, as the one illustrated on FIG. 1, the process (1000) may further comprise after the sealing step (1300), another step of contacting again the at least one metallic surface of the metallic product with the first biocidal solution (1400). It has been discovered that this second contact with the biocidal solution, even after the sealing of the pore, may increase the useful life of the biocidal metallic product.

According to a preferred embodiment, anodizing the metallic surfaces (1100) is performed using a current ranging from about 1 A/dm$^2$ to about 5 A/dm$^2$, preferably from 2 to 4 A/dm$^2$. As detailed herein after, it has been discovered that low current density will provide smaller sized pores and a slower diffusion of the biocidal solution out of the pores, thereby providing biocidal properties to the metallic product for a longer period of time.

According to a preferred embodiment, the first biocidal solution comprises at least one of antibiotics, biocidal peptides, enzymes, cationic compounds or a combination thereof. More particularly, the first biocidal solution comprises at least one cationic compound such as quaternary ammonium compounds (QACs). Indeed, amongst the biocidal candidates under investigation, QACs are effective against a wide spectrum of Gram-positive and Gram-negative bacteria. Advantages of QACs include amphiphilic solubility, effective over a wide pH range, low toxicity to human cells, low vapor pressure and is odorless, among others. More specifically, QACs are highly effective against *Staphylococcus aureus*, the most frequently identified source of nosocomial infections and infections originating in public transport environment.

The Applicant has particularly developed the first biocidal solution, herein after named A3S solution, which typically comprises a quaternary ammonium, such as Alkyl Dimethyl Benzyl Ammonium Chloride (ADBAC). More preferably, the porous surface layer comprises at least two quaternary ammonium compounds i.e. Alkyl Dimethyl Benzyl Ammonium Chloride (ADBAC) and Didecyl Dimethyl Ammonium Chloride (DDAC). The solution may further comprise $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$ or a mixture thereof.

According to a preferred embodiment, the first solution comprises quaternary ammonium chlorides as disclosed herein, and silver nitrate ($AgNO_3$), leading to the formation in situ of silver chloride (AgCl). It has been discovered that the presence in situ of AgCl in the first treating solution increases or promotes the biocidal properties of the biocidal metallic product.

According to a preferred embodiment, impregnating the pores with the first biocidal solution comprises dipping the anodized metal in the biocidal solution for a first period of time. Typically, the first period of time is about 15 seconds to 1 hour, preferably from 5 minutes to 45 minutes, more preferably about 15-30 minutes.

According to a preferred embodiment, the sealing of the pores comprises heating the treated anodized metallic product into a water bath or, more preferably, a bath of a solution of nickel acetate, magnesium acetate or the like, at a temperature of about 70-90° C. during a given period of time of about 1-15 minutes, preferably from 2 to 5 minutes, more preferably about 2 minutes. Other sealing methods may be used without departing from the scope of the present invention.

According to a preferred embodiment, the metallic surface of the product to treat may comprises steel, aluminum, titanium, zinc, magnesium, niobium, tantalum or anodizable alloys thereof. More preferably, the metal is aluminum or anodizable alloys thereof. Also, the biocidal metallic product may comprise steel or anodizable alloys, such as preferably stainless steel, such as, but no limited to the 304 or 316 stainless steels.

According to a preferred embodiment, as the one illustrated on FIG. 1, the process (1000) may further comprise after anodizing: rinsing the metallic product with an acidic solution (1500), for instance with a 0.1 to 5% sulfuric acid solution. It has been discovered that this rinsing step with an acidic solution may create a plurality of small cracks on the surface of the metallic product. The cracks generally are larger in size than the pores created by the anodization, thereby increasing the metallic product's storage capacity of the biocidal solution, in particular of metal particles when the biocidal solution comprises metallic salts, such as those disclosed herein, providing particles of Ag, Cu, Ni, Ti and/or Zn.

The process disclosed herein is simpler, quicker and cheaper for treating the surface of anodizable metals than the previous, for instance by eliminating steps related to the electrodeposition of metals on the anodized surface.

The Biocidal Metallic Products:

As aforesaid, the invention is also directed to the biocidal metallic products obtained by the process as defined herein. The metallic products can be characterized by anodized surfaces having sealed pores with a depth of the pores from 5 to 150 µm, preferably of from 50 to 100 µm, and a diameter of the pores ranging from 5 to about 100 nm.

Furthermore, it has been discovered that, in accordance with a preferred embodiment, the process may lead to an anodized surfaces having, in addition to the pores formed during the anodizing step, a plurality of cracks or fissures formed over the surface, typically formed during the preferred steps of rinsing the products with cold mild acidic solution and cold water due to a thermic chock. Indeed, the rinsing step may consist in plunging the metallic products which may be at a temperature of about 60-100° C., in a bath comprising the cold mild acid solution or cold water. The presence of the cracks or fissures may provide a better impregnation of the biocidal solution over the anodized surfaces, and therefor a longer useful life of the biocidal metallic products.

Of course, the biocidal metallic product also comprises steel, aluminum, titanium, zinc, magnesium, niobium, tantalum or anodizable alloys thereof. Preferably, the metallic product comprises aluminum or anodizable alloys thereof. Also, the biocidal metallic product may comprise steel or anodizable alloys thereof.

The products obtained by the process as disclosed herein, show a controlled color and longer biocidal properties. Furthermore, the biocidal metallic surfaces obtained by these processes improved biocidal properties in high humidity and aqueous environments.

The biocidal metallic products of the present invention are particularly useful in the manufacture of articles used in houses, medical facilities and public transports, such as for instance in the making of kitchen wares, kitchen countertops, hospital countertops, furniture, fixtures, appliances, office equipment, door knobs, medical devices, wall panels, floor panels, machine keypads and grab rails.

Reactivating Method:

Although the making process according to the present invention allows manufacturing of biocidal metallic products with a longer useful life than those known in the art, the metallic products once installed on site cannot be easily removed or replaced with a new product. Accordingly, a new method for extending the useful life and biocidal properties of biocidal metallic products (either obtained by the process as disclosed herein or any anodized metallic surface) has been developed.

According to a preferred embodiment, as the one illustrated on FIG. 2, the method consists in contacting the anodized surfaces of the pre-treated biocidal metallic products with a second biocidal solution (2100), for reactivating the pores with the second solution.

According to a preferred embodiment, the second solution may contain the same ingredients as the first solution used for the manufacturing process (1000). However, the second solution may have a lower concentration of its active ingredients (diluted solution). Advantageously, the method provides an easy way for re-activating or reloading the products without having to move the products from site. Also, the second "reactivating" solution has a lower concentration of QACs, providing a safer way to treat the surfaces, periodically, by the persons in charge of the maintenance or cleaning of the metallic parts. As an example, the holding bars of metro or bus cars can be reactivated by spraying the second solution over the surfaces.

Different ways for reactivating the surfaces with the second biocidal solution have been tested and are efficient.

Firstly, as aforesaid, one can spray the second solution over the surface; and let the spread second solution over the surface for a third period of time, typically from 5 seconds to 30 minutes. It has to be understood that the contacting time and the volume of solution by surface to be treated vary in function of the thickness of the anodized surfaces (number and size of the pores, presence of cracks or not, etc). Preferably, the method may further comprise removing an exceeding portion of the second solution that has not been absorbed into the pores after the third period of time. This first option is particularly adapted for reactivating vertical surfaces, such as transport handle bars, for instance during the cleaning process of the transport vehicle.

Alternatively, the surface of the biocidal metallic products may be contacted with the second biocidal solution by applying the second solution over the surfaces with a cloth previously soaked into or impregnated with the second solution. Preferably, the solution is wiped at least one time, preferably several times with the soaked cloth, until the pores are re-filled with the second solution. This second option is particularly adapted for reactivating horizontal surfaces, such as kitchen counters.

Thirdly, reloading the surfaces of the biocidal metallic product with the second biocidal solution may consist in soaking or dipping the biocidal metallic product into the second solution for the second period of time; removing the biocidal metallic product from the second solution, and optionally removing an exceeding portion of the second solution that has not been absorbed into the pores. This solution is particularly adapted for mobile and small products than can me removed from site, such as metallic tools.

According to a preferred embodiment, the second biocidal solution comprises a second concentration of at least one of antibiotics, biocidal peptides, enzymes, cationic compounds or a combination thereof.

According to a preferred embodiment, the second solution comprises at least one cationic compound. Preferably, the cationic compound comprises at least one quaternary ammonium compound (QACs), such as a diluted solution of D-germ-5 As for the A3 S solution used during the making process of the biocidal products, the second "reloading" solution may further comprise at least one metallic salt, such as $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$, and a combination thereof. More preferably, the salt is $AgNO_3$ reacting with the QACs to form in situ silver chloride, AgCl, which is particularly efficient as biocide.

Preferably, the second concentration of the second solution is inferior to the first concentration of the first solution as defined herein, for instance 10 time diluted solution. Advantageously, the second solution being less concentrated is safer to use for the person in charge of reactivating the metallic surface.

EXAMPLES

The purpose of the following examples is to demonstrate or establish a correlation between the control of the anodizing step on the resulting density, location and size of pores created on the metallic surface, density and size, and a correlation between the pore configurations and microbial properties of the final product.

Biocidal Solutions (Manufacturing and Reactivating Solutions)

TABLE 1

Examples of first solutions for the manufacturing of biocidal metallic products and second solutions for their reloading:

| Components | First Solution - A3S (Manufacturing) | Second solution (Reloading) |
|---|---|---|
| Quaternary ammonium chloride (e.g. D-Germ 5*) | 5-15 wt. % | 0.01-1.5 wt. % |
| Metallic salts (optional) | 0 to 1% (e.g. 0.1% of $AgNO_3$) | 0 to 0.1 wt. % |
| Dilution (e.g. water) | 0% | 1% to 99% (e.g. 50%) |
| Vol./Surface to be treated | ≥0.5 µl/cm² (Variable - depends on the anodized layer thickness) | N/A |
| Time of contact | 15-30 minutes | 10 seconds to 5 minutes |
| Method of contact | Dipping/Soaking | Soaking Spraying Wiping |

(*10.85% quaternary ammonium 5$^{th}$ generation type, such as D-Germ 5 solution.

Manufacturing Process

Example 1: Sealing/Dipping Order of Antibacterial and Sealing Treatments

Four pieces of 3"×3" aluminum were hard anodized (3-5 A/dm²) until a pore depth of 22±2 µm before being treated post-anodization. Each pieces have been washed in a 53° C. solution of industrial aluminum soap for 8 minutes, rinsed in water, etched in a 56° C. sodium hydroxide solution for a minute, rinsed again in water, cleaned in a mix of deoxidizing solutions for 5 minutes before being rinsed in water a last time. A non-biocidal treated but sealed piece was used as a negative control which should not have any biocidal activity. A second piece was treated in antibacterial A3 S solution before sealing. A third piece was treated with A3 S solution both before and after sealing. The fourth and last piece was treated with A3 S after the sealing procedure. Biocidal treatments were made for 15 minutes at room temperature while sealing was in an acetate nickel bath of 80° C. These pieces were rinsed and dried before biocidal testing on *Staphylococcus aureus* (ATCC® 6538).

Pieces were inoculated with $7,5.10^5$ bacteria and incubated for 10 minutes at 22° C. Those bacteria were then harvested and plated at 37° C. overnight. Water depletion tests were done for periods of one hour per depletion. Each depletion was followed by inoculations, harvests and plating. Four depletions in total were done for every aluminium piece.

TABLE 2

Experiment #1 results.

| Depletion | Negative control | Presealing treatment | Double treatment | Postsealing treatment |
|---|---|---|---|---|
| 0 | +++ | − | − | − |
| 1 | +++ | + | − | − |
| 2 | +++ | + | ± | ± |
| 3 | +++ | + | ± | + |
| 4 | +++ | +++ | + | +++ |

In Table 2, the symbol "−" means no bacterial growth, "±" means a few colonies were visible, "+" means a weak bacterial growth, "++" means an average bacterial growth, "+++" means a strong bacterial growth or a bacterial lawn.

Results show similar efficiency between pieces treated by A3 S, either before or after sealing, before depletion tests. Double and post-sealing treatment show continuous biocidal activity after one water depletion test while pre-sealing did not kill every bacteria within the 10 minute timespan. The double treatment shows better efficiency than post-sealing treatment after 3 depletions and is the only piece which still has any biocidal efficiency after 4 depletions. The negative control has never shown any biocidal proprieties.

According to a preferred embodiment, the double treatment method seems to be more durable and efficient than the one treatment method.

Example 2: Anodization Current's Influence on Biocidal Efficiency after Water Depletion Two pieces of 3"×3" aluminum were hard anodized to a pore depth of 22±2 µm. Both pieces have been washed in a 53° C. solution of industrial aluminum soap for 8 minutes, rinsed in water, etched in a 56° C. sodium hydroxide solution for a minute, rinsed again in water, cleaned in a mix of deoxidizing solutions for 5 minutes before being rinsed in water a last time. The two pieces were anodized using different current, 2 A/dm² and 4 A/dm² respectively. Post-anodization treatments were the same, as both pieces were dipped in A3S biocidal solution for 15 minutes, sealed at 80° C. in acetate nickel solution for 2 minutes before being dipped once again in the biocidal solution. Pieces were rinsed and dried before biocidal testing on *Staphylococcus aureus* (ATCC 6538).

Pieces were inoculated with $1.5 \cdot 10^6$ bacteria and incubated for 5 minutes at 22° C. Those bacteria were then harvested and plated at 37° C. overnight. Water depletion tests were done for periods of 10 minutes per depletion. Each depletion was followed by inoculations, harvests and plating. Nine depletions in total were done for every aluminium piece.

TABLE 3

Experiment #2 results. CFU (Colony-forming unit) were measured for every plates. TNC = Too many to be measured.

| Depletion | 2 A/dm² (CFU) | 4 A/dm² (CFU) |
|---|---|---|
| 0 | 0 | 0 |
| 1 | 1 | 16 |
| 2 | 73 | 158 |
| 3 | 243 | 292 |
| 4 | 206 | 592 |
| 5 | 79 | 560 |
| 6 | 326 | TNC |
| 7 | TNC | TNC |
| 8 | TNC | TNC |
| 9 | TNC | TNC |

Results in table 3 demonstrate that slower anodization, which uses lower current (2 A/dm²) has a longer lasting biocidal activity compared to faster anodization after the first depletion. The slower anodization had lower amount of CFU for every depletion until the $7^{th}$, which has an uncountable bacterial lawn on both plates. Low current anodization appears to be more resistant to water depletion.

Example 3: Anodization Current's Influence on Biocidal Efficiency on Agar Plate Depletion Four pieces of round aluminum of 1.1 cm diameter were hard anodized to a pore depth of 60±2 μm. Each pieces have been washed in a 53° C. solution of industrial aluminum soap for 8 minutes, rinsed in water, etched in a 56° C. sodium hydroxide solution for a minute, rinsed again in water, cleaned in a mix of deoxidizing solutions for 5 minutes before being rinsed in water a last time. The four pieces were anodized using different current, one at 2 A/dm², two at 3 A/dm² and the last one at 4 A/dm². Post-anodization treatments were the same for the 2 and 4 A/dm². These pieces were dipped in A3 S biocidal solution for 15 minutes, sealed at 80° C. in acetate nickel solution for 2 minutes before being dipped once again in the biocidal solution for 15 minutes. One of the 3 A/dm² was simply sealed for 15 minutes and used as control while the last piece was treated in A3 S solution for 15 minutes before 5 minutes of sealing. Pieces were rinsed and dried before biocidal testing on *Staphylococcus aureus* (ATCC 6538).

An agar plate was inoculated using a swab dipped in 0.1-DO600 solution of *Staphylococcus aureus*. The plate was streaked 3 times, each time with a 60 degree rotation to ensure an even distribution of inoculum. It was left to dry for 3 minutes before putting an aluminium piece for a period of 5 minutes, then putting it at another spot to make a second deposit, and so on for 24 deposits. 6 deposits were made per agar plate to prevent too much drying. The three other pieces were treated this same way. Agar plates were then put at 37° C. overnight and the radius of the inhibition zone was measured the following day.

TABLE 4

Experiment 3 results. Inhibition zones measured were the shortest radius multiply by 2 to make a diameter.

| | Inhibition zone (mm) | | | |
|---|---|---|---|---|
| Times deposited | 2 A/dm² | 3 A/dm² | 4 A/dm² | Control |
| 1 | 26 | 22 | 24 | 0 |
| 2 | 24 | 22 | 24 | 0 |
| 3 | 24 | 22 | 22 | 0 |
| 4 | 22 | 22 | 20 | 0 |
| 5 | 22 | 22 | 20 | 0 |
| 6 | 22 | N/A | 20 | 0 |
| 7 | 20 | 18 | 18 | 0 |
| 8 | 20 | 16 | 16 | 0 |
| 9 | 20 | 16 | 16 | 0 |
| 10 | 18 | 16 | 14 | 0 |
| 11 | 18 | 16 | 14 | 0 |
| 12 | 18 | 16 | 14 | 0 |
| 13 | 18 | 16 | 14 | 0 |
| 14 | 18 | 16 | 14 | 0 |
| 15 | 18 | 16 | 14 | 0 |
| 16 | 18 | 16 | 14 | 0 |
| 17 | 18 | 14 | 14 | 0 |
| 18 | 18 | 14 | 14 | 0 |
| 19 | 18 | 14 | 14 | 0 |
| 20 | 16 | 18 | 12 | 0 |
| 21 | 16 | 14 | 12 | 0 |
| 22 | 16 | 14 | 12 | 0 |
| 23 | 16 | 14 | 12 | 0 |
| 24 | 16 | 14 | 10 | 0 |

Following 24 deposits of Table 4, the pieces with the lower current during anodization were the ones with the biggest inhibition zone. The 4 A/dm² was initially having a bigger zone than the 3 A/dm², but ended up less effective after 24 times. The 3 A/dm² ended up more effective despite the longer sealing and absence of redipping. The control of the amperage used for the anodization step allows controlling the inhibition zone of the treated material. For example, it can been seen from these data that the inhibition zone is larger with 2 A/dm² than for 4 A/dm².

A biocidal metallic product is therefore obtained by the process as defined in herein. The metallic products as treated will have anodized surfaces with sealed pores all over the surfaces, pores having depth of 5 to 150 μm, preferably 50-100 μm. It has been discovered that the more the pores are small, the longer is the diffusion of the biocidal solution out of the sealed pores. Based on the results presented here, a clear correlation exists between size and distribution of the pores on the surface, and biocidal properties of the final product.

Advantageously, the anodizing process and simple dipping-sealing process of the pore, followed by an optional additional dipping into the microbial solution, shows first excellent results with higher microbial activities, activities that will last for a larger period time than the previous methods.

The new treated products will be useful for the manufacturing of a plurality of equipment or furniture, used in houses, medical facilities and public transports. It would be safer and less stressful for the users of public transport to use holding bars and supporting element made with the biocidal product obtained by the present process. The biocidal metallic products made by the present process will be useful for the making of kitchen wares, kitchen countertops, hospital countertops, furniture, appliances, office equipment, door knobs, door pushing plates, medical devices, wall panels, floor panels, machine keypads and grab rails.

Example 5: Steel Treatment

Four pieces of 2"×6" Stainless steel 304 were hard anodized at a voltage of 55-60V in a solution at 5° C. of ethylene glycol containing 10% of perchloric acid before being treated post-anodization. Each pieces have been washed in a 53° C. solution of industrial aluminum soap for 8 minutes, rinsed in water. A non-biocidal treated stainless was used as a negative control which should not have any biocidal activity. Biocidal treatments were made for 5 or 15 minutes at room temperature. These pieces were rinsed and dried before biocidal testing on *Escherichia coli* (ATCC® 8739).

Pieces were inoculated with $2.45 \times 10^7$ bacteria for 5 minutes at room temperature. Those bacteria were then harvested and plated at 37° C. overnight. Enumeration of viable microorganisms was achieved. The average of colony forming unit by mL for each specimen, the logarithmic average and the antimicrobial activity for each test performed were calculated using the formulas presented in sections 8.1 the ISO 22196 method.

TABLE 5

Experiment #5 results.

| Samples | Average count per sample (CFU/mL) | Reduction percent (%) | Reduction Log |
|---|---|---|---|
| Negative control | >3000 | <95.92 | 1 |
| 1 | <10 | >99.99 | ≥4 |
| 2 | <10 | >99.99 | ≥4 |
| 3 | <10 | >99.99 | ≥4 |
| 4 | <10 | >99.99 | ≥4 |

In Table 5, results show the average count by specimen for the negative control and the treated samples after 5. The negative control has never shown any biocidal proprieties.

By comparing untreated and treated specimens with an equivalent contact time, the treatment was able of a reduction of 4 log 10 against *E. coli* with a contact time of 5 minutes.

According to a preferred embodiment, biocidal steel plates can be prepared by anodizing the steel plates before contacting the anodized steel plates with the biocidal solution. It has been demonstrated that that the biocidal properties of anodized steel plates remains active over time, even though, as demonstrated in this example, the step of sealing the pores can be optional.

Example 6: Reactivating Method

Two door handles made from the biocidal metallic product obtained by the process were installed inside the Applicant's laboratories. Results are presented in Table 6 below.

TABLE 6

Experiment #6 results.

| Date of control | Handles | Results |
|---|---|---|
| 2020 Apr. 29 | 1 | ++ (24) |
|  | 2 | + (4) |
| 2020 May 1 | 1-2 | Reactivation with A3S solution |
| 2020 May 6 | 1 | − (0) |
|  | 2 | − (0) |
| 2020 May 13 | 1 | − (0) |
|  | 2 | − (0) |
| 2020 May 27 | 1 | − (0) |
|  | 2 | − (0) |

TABLE 6-continued

Experiment #6 results.

| Date of control | Handles | Results |
|---|---|---|
| 2020 Jun. 2 | 1 | − (0) |
|  | 2 | − (0) |
| 2020 Jun. 10 | 1 | − (0) |
|  | 2 | − (0) |

The handles were tested for the first on Apr. 29, 2020, after about 10 months of use. Table 6 above shows low or quasi-inexistent bacterial contamination. The handles were reactivated on May 1, 2020 using A3 S solution during a cleaning process of the handles. A solution of 2% of quaternary ammonium chloride is sprayed over the surface and let dry. The next five controls show the efficiency of the reactivating method.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A process for the making of a metallic product having biocidal properties, the process comprising:
   anodizing a product having at least one metallic surface using a controlled current density, the controlled anodization allowing to form pores on the metallic surfaces to be treated with controlled spatial density and depth, or
   alternatively providing a product previously anodized with at least one anodized metallic surface with pores;
   rinsing the at least one anodized metallic surface with a first acidic solution;
   rinsing again the at least one anodized metallic surface with a second acidic solution or water, wherein a temperature the second acidic solution or water is inferior to a temperature of the product in order to form fissures on the at least one metallic surface;
   contacting the at least one anodized metallic surface with a first biocidal solution for a first period of time;
   sealing the pores; and
   contacting again the at least one metallic surface of the metallic product with the first biocidal solution;
   wherein the process is free of steps related to electrodeposition of metals on the at least one anodized surface.

2. The process according to claim 1, wherein the first acidic solution comprises from about 0.15% to about 5% of sulfuric acid.

3. The process according to claim 1, wherein
   the current density of the anodizing step is ranging from about 1 A/dm$^2$ to about 5 A/dm$^2$.

4. The process according to claim 3, wherein the current density is from 2 to 4 A/dm$^2$.

5. The process according to claim 1, wherein the first biocidal solution comprises a first concentration of at least one of antibiotics, biocidal peptides, enzymes, cationic compounds or a combination thereof.

6. The process according to claim 5, wherein the first biocidal solution comprises at least one cationic compound.

7. The process according to claim 6, wherein the at least one cationic compound comprises at least one quaternary ammonium compound.

8. The process according to claim 1, wherein the first biocidal solution further comprises at least one metallic salt selected from the group consisting of $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$, or a combination thereof.

9. The process according to claim 8, wherein the at least one metallic salt is $AgNO_3$, whereby in use, $AgNO_3$ with the at least one quaternary ammonium compound form in situ $AgCl$.

10. The process according to claim 1, wherein contacting the at least one anodized metallic surface with the first biocidal solution comprises:
dipping the at least one anodized metallic surface into the first biocidal solution for the first period of time.

11. The process according to claim 10, wherein the first period of time is about 15 minutes to about 30 minutes.

12. The process according to claim 1, wherein sealing the pores comprises heating the at least one metallic surface in a bath of water or of nickel acetate solution for a second period of time, the bath being at a temperature of about 70-90° C.; wherein the second period of time is about 1 minute to about 15 minutes.

13. The process according to claim 1, wherein the metallic product comprises steel, aluminum, titanium, zinc, magnesium, niobium, tantalum or anodizable alloys thereof.

14. The process according to claim 13, wherein the metallic product comprises aluminum or anodizable alloys thereof; or wherein the metallic product comprises steel or anodizable alloys thereof.

15. The process as claimed in claim 1, further comprising, after the step of sealing the pores:
reactivating the biocidal properties of the biocidal metallic product by contacting the at least one anodized metallic surface with a second biocidal solution;
wherein the first biocidal solution used for the making of the biocidal metallic product comprises a first concentration of at least one of antibiotics, biocidal peptides, enzymes, cationic compounds or a combination thereof;
wherein the second biocidal solution comprises a second concentration of said at least one of antibiotics, biocidal peptides, enzymes, cationic compounds or a combination thereof; and
wherein the second concentration of the second biocidal solution is inferior to the first concentration of the first biocidal solution.

16. The process according to claim 15, wherein the step of contacting at least one surface of said biocidal metallic product with a second biocidal solution comprises:
spraying the second solution over the at least one surface;
letting the spread second solution over the at least one surface for a third period of time; and
after said third period of time, optionally removing an exceeding portion of the second solution from the at least one surface.

17. The process according to claim 16, wherein the third period of time is from 5 seconds to 30 minutes.

18. The process according to claim 15, wherein the step of contacting at least one surface of said biocidal metallic product with a second biocidal solution comprises:
applying the second biocidal solution over the at least one surface with a cloth previously soaked into the second biocidal solution.

19. The process according to claim 18, wherein applying the second solution over the at least one surface with a cloth previously soaked into the solution comprises:
wiping at least one time the at least one surface with the soaked cloth;
wherein the at least one surface is wiped several times with the soaked cloth.

20. The process according to claim 15, wherein the step of contacting at least one surface of said biocidal metallic product with a second biocidal solution comprises:
soaking the biocidal metallic product into the second solution for a fourth period of time;
removing the biocidal metallic product from the second biocidal solution; and
optionally, removing an exceeding portion of the second biocidal solution from the at least one surface.

21. The process according to claim 15, wherein the second biocidal solution comprises at least one cationic compound.

22. The process according to claim 21, wherein the cationic compound comprises at least one quaternary ammonium compound.

23. The process according to claim 15, wherein the second biocidal solution further comprises at least one metallic salt selected from the group consisting of $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$, or a combination thereof.

24. The process according to claim 15, wherein the second concentration is about ten times inferior than the first concentration.

25. A process for the making of a metallic product having biocidal properties, the process comprising:
anodizing a product having at least one metallic surface using a controlled current density, the controlled anodization allowing to form pores on the metallic surfaces to be treated with controlled spatial density and depth, or
alternatively providing a product previously anodized with at least one anodized metallic surface with pores;
rinsing the at least one anodized metallic surface with a first acidic solution;
rinsing again the at least one anodized metallic surface with a second acidic solution or water, wherein a temperature the second acidic solution or water is inferior to a temperature of the product in order to form fissures on the at least one metallic surface;
contacting the at least one anodized metallic surface with a first biocidal solution for a first period of time;
sealing the pores; and
after a second period of time, contacting the at least one anodized metallic surface with a second biocidal solution for reactivating the biocidal properties of the biocidal metallic;
wherein the first biocidal solution used for the making of the biocidal metallic product comprises a first concentration of at least one of antibiotics, biocidal peptides, enzymes, cationic compounds or a combination thereof;
wherein the second biocidal solution comprises a second concentration of said at least one of antibiotics, biocidal peptides, enzymes, cationic compounds or a combination thereof;
wherein the second concentration of the second biocidal solution is inferior to the first concentration of the first biocidal solution; and
wherein the process is free of steps related to electrodeposition of metals on the at least one anodized surface.

26. The process according to claim 25, further comprising after sealing the pores:
   contacting again the at least one metallic surface of the metallic product with the first biocidal solution.

27. The process according to claim 25, wherein the first acidic solution comprises from about 0.15 to about 5% of sulfuric acid.

28. The process according to claim 25, wherein the first and second biocidal solutions comprise at least one quaternary ammonium compound.

29. The process according to claim 27, wherein the first and second biocidal solutions further comprise at least one metallic salt selected from the group consisting of $Ni(NO_3)_2$, $AgNO_3$, $Ti(NO_3)_3$, $Zn(NO_3)_2$, $Cu(NO_3)_2$, $NiCl_2$, $AgCl$, $ZnCl_2$, $CuCl_2$, $Ni_3(PO_4)_2$, $Ag_3PO_4$, $Zn_3(PO_4)_2$, $Cu_3(PO_4)_2$, and a combination thereof.

30. The process according to claim 25, wherein the second concentration of the second biocidal solution is about ten times inferior than the first concentration of the first biocidal solution.

* * * * *